United States Patent
Shibata et al.

(10) Patent No.: US 8,884,985 B2
(45) Date of Patent: Nov. 11, 2014

(54) INTERFACE APPARATUS, METHOD, AND RECORDING MEDIUM

(75) Inventors: Tomoyuki Shibata, Kawasaki (JP);
Masashi Nishiyama, Kawasaki (JP);
Yasunobu Yamauchi, Yokohama (JP);
Tomoki Watanabe, Kawasaki (JP)

(73) Assignee: Kabushiki, Kaisha Toshiba, Minato-ku, Tokyo (JP)

( * ) Notice: Subject to any disclaimer, the term of this patent is extended or adjusted under 35 U.S.C. 154(b) by 256 days.

(21) Appl. No.: 13/240,390

(22) Filed: Sep. 22, 2011

(65) Prior Publication Data
US 2012/0194545 A1 Aug. 2, 2012

(30) Foreign Application Priority Data
Feb. 1, 2011 (JP) ................................ 2011-020038

(51) Int. Cl.
| | |
|---|---|
| G09G 5/00 | (2006.01) |
| G06F 3/042 | (2006.01) |
| G06F 3/0482 | (2013.01) |
| G06F 3/0488 | (2013.01) |
| G06K 9/00 | (2006.01) |
| G06F 3/048 | (2013.01) |
| H04N 9/31 | (2006.01) |

(52) U.S. Cl.
CPC .............. *G06F 3/042* (2013.01); *G06F 3/0482* (2013.01); *G06F 3/04883* (2013.01); *G06F 2203/04807* (2013.01); *G09G 2354/00* (2013.01); *G06K 9/00* (2013.01); *G06F 3/0425* (2013.01); *G06F 3/048* (2013.01); *H04N 9/3179* (2013.01)
USPC ............ 345/629; 345/158; 345/173; 715/762

(58) Field of Classification Search
CPC ................ G09G 5/14; G09G 2340/10; G09G 2340/125; G06T 11/60; H04N 5/44504
USPC ........................... 345/158, 173, 629; 715/762
See application file for complete search history.

(56) References Cited

U.S. PATENT DOCUMENTS 7,072,108 B2 * 7/2006 Cruz-Uribe et al. .......... 359/443
2001/0030668 A1 * 10/2001 Erten et al. .................... 345/863
(Continued)

FOREIGN PATENT DOCUMENTS

| JP | 2007-72891 A | 3/2007 | |
|---|---|---|---|
| JP | 2008-152622 A | 7/2008 | |
| JP | 2008-250482 A | 10/2008 | |
| JP | 02009064109 A * | 3/2009 | .............. G06F 3/038 |

*Primary Examiner* — Xiao Wu
*Assistant Examiner* — Todd Buttram
(74) *Attorney, Agent, or Firm* — Ohlandt, Greeley, Ruggiero & Perle, L.L.P.

(57) ABSTRACT

According to one embodiment, an interface apparatus for displaying a GUI object according to a position and a direction of a pointing object comprises a display unit, an image capturing unit, a detection unit, and an additional display unit. The display unit displays a movie based on a first image frame group. The image capturing unit obtains a second image frame group by capturing an image of a surface on which the movie is displayed. The detection unit detects a position and a direction of the pointing object based on the first image frame group and the second image frame group. The additional display unit displays a specific shape which is superimposed to the first image frame group, so that the detected position of the pointing object is irradiated with light of no less than a predetermined illuminance and the light attenuates according to a distance from the position.

18 Claims, 14 Drawing Sheets

(56) References Cited

U.S. PATENT DOCUMENTS

| | | |
|---|---|---|
| 2006/0132460 A1* | 6/2006 | Kolmykov-Zotov et al. . 345/173 |
| 2007/0008300 A1* | 1/2007 | Yang et al. .................... 345/173 |
| 2007/0236454 A1* | 10/2007 | Ung et al. ..................... 345/158 |
| 2011/0205163 A1* | 8/2011 | Hinckley et al. .............. 345/173 |
| 2012/0032979 A1* | 2/2012 | Blow et al. .................... 345/647 |
| 2012/0035934 A1* | 2/2012 | Cunningham ................ 704/260 |
| 2013/0096575 A1* | 4/2013 | Olson ........................... 606/130 |

\* cited by examiner

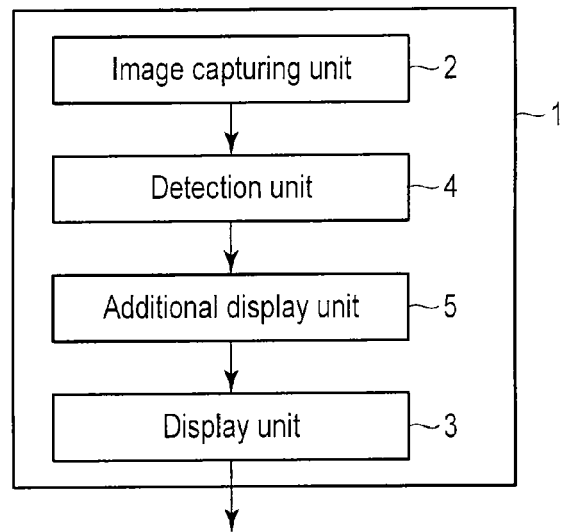
F I G. 1
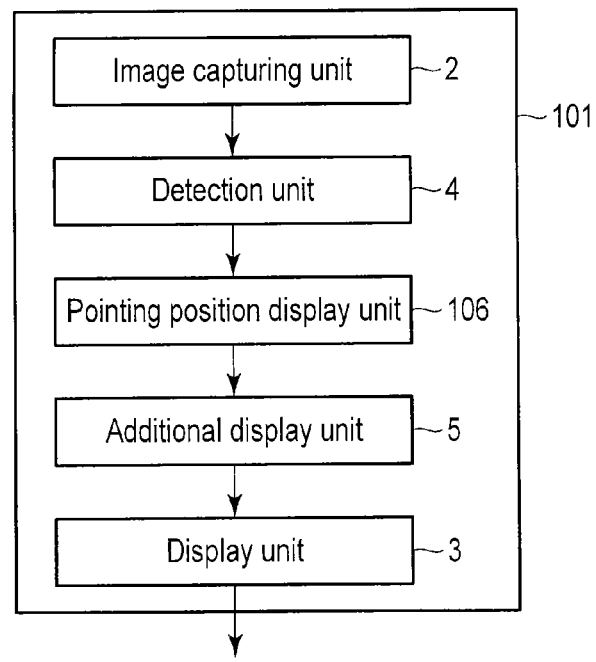
F I G. 2

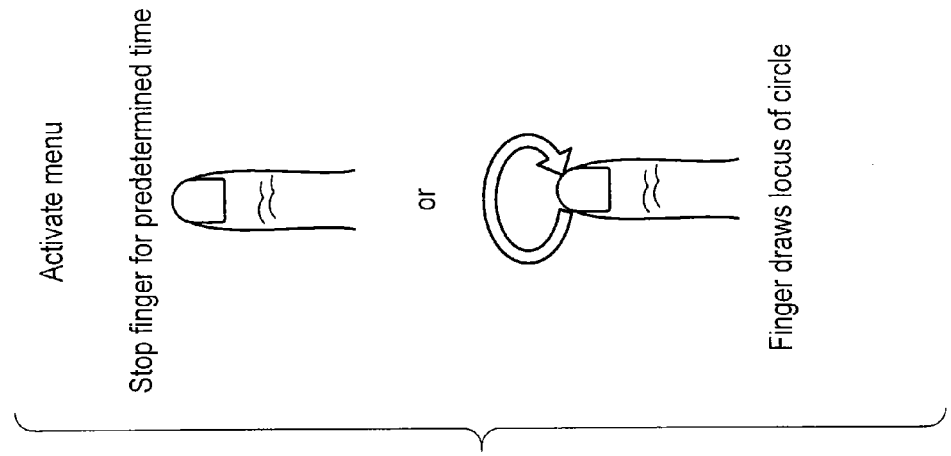
F I G. 5A
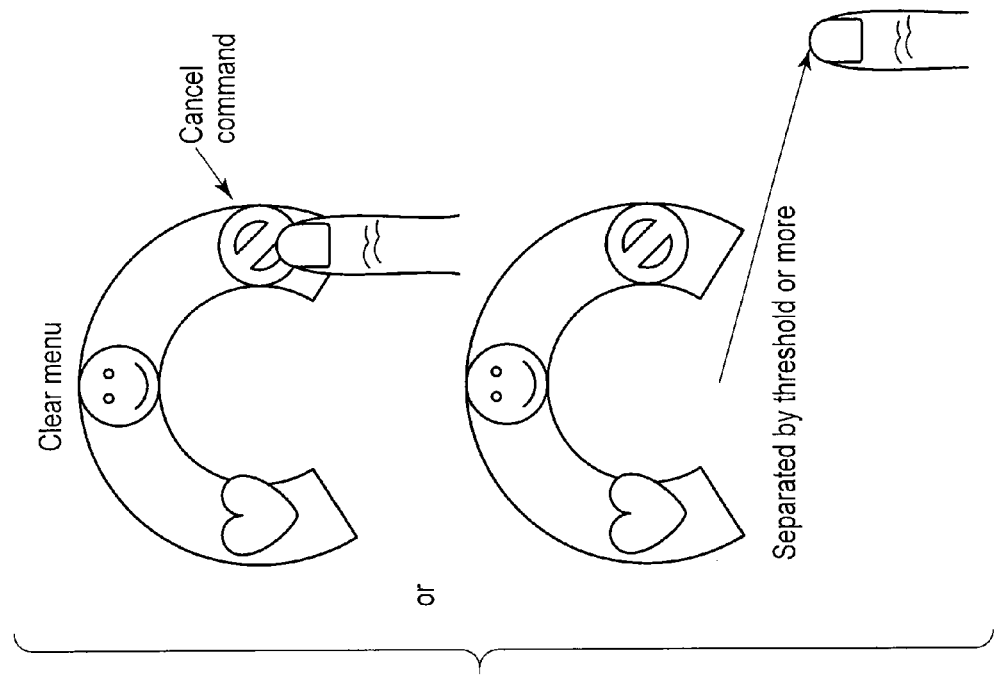
F I G. 5B

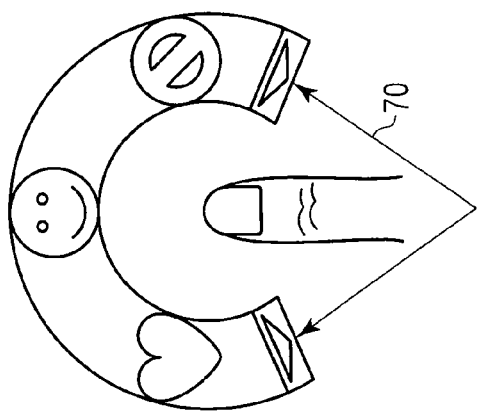
F I G. 7B
When finger is circulated on site, icons to be displayed move in same direction, and icons within visible range are switched
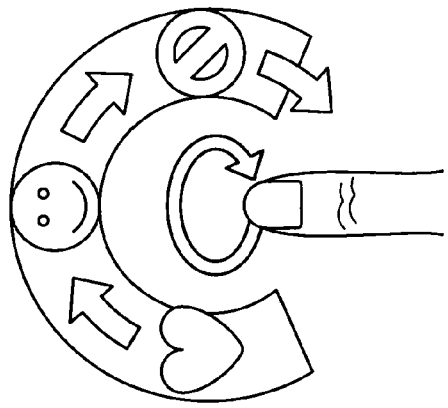
F I G. 7A
When there are plural icons
Lay out buttons used to change icons to be displayed without displaying all icons

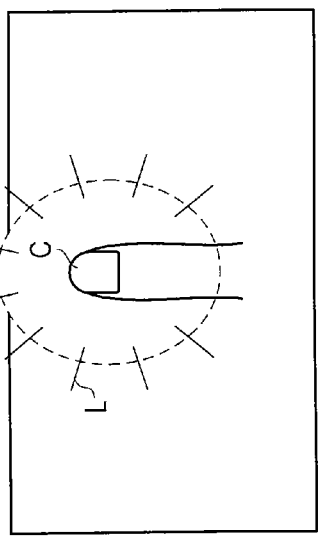
FIG. 8A
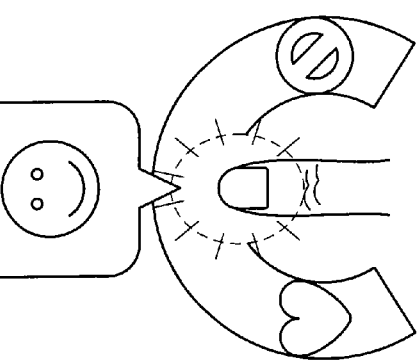
FIG. 8B
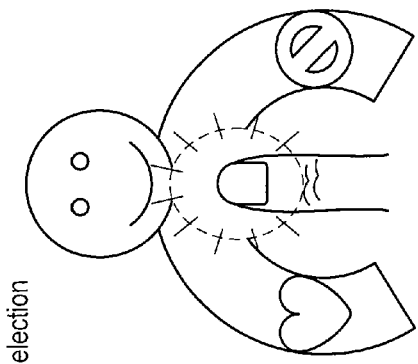
FIG. 8C
FIG. 8D

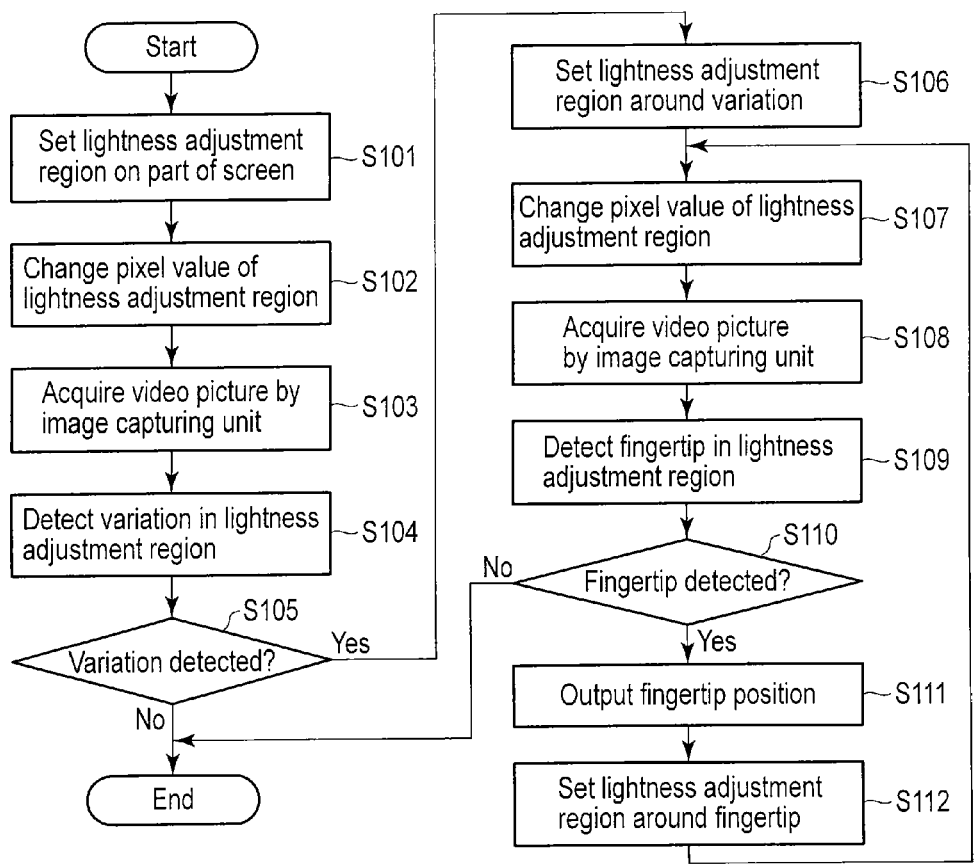
F I G. 10
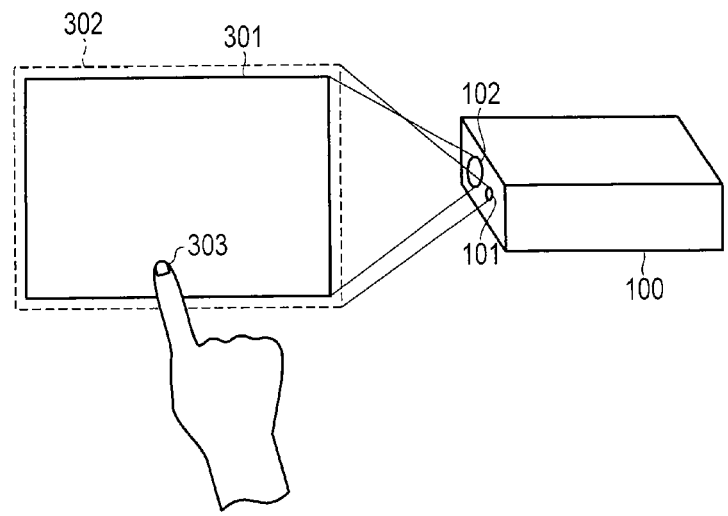
F I G. 11

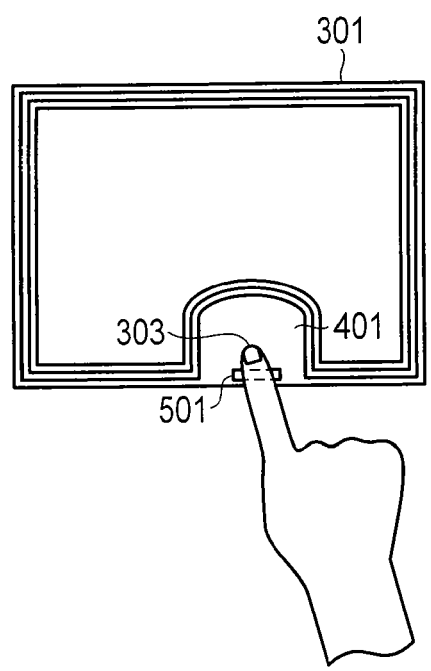
F I G. 13
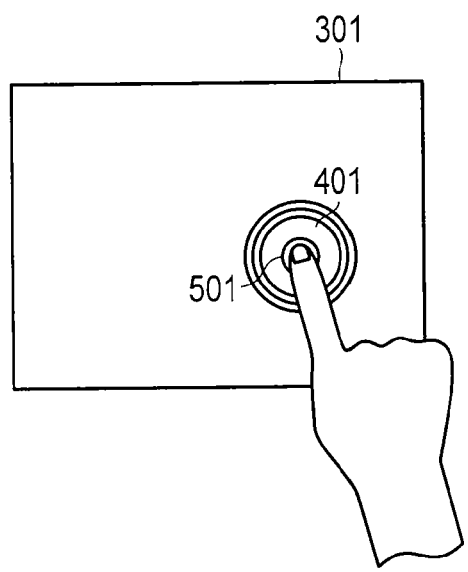
F I G. 14

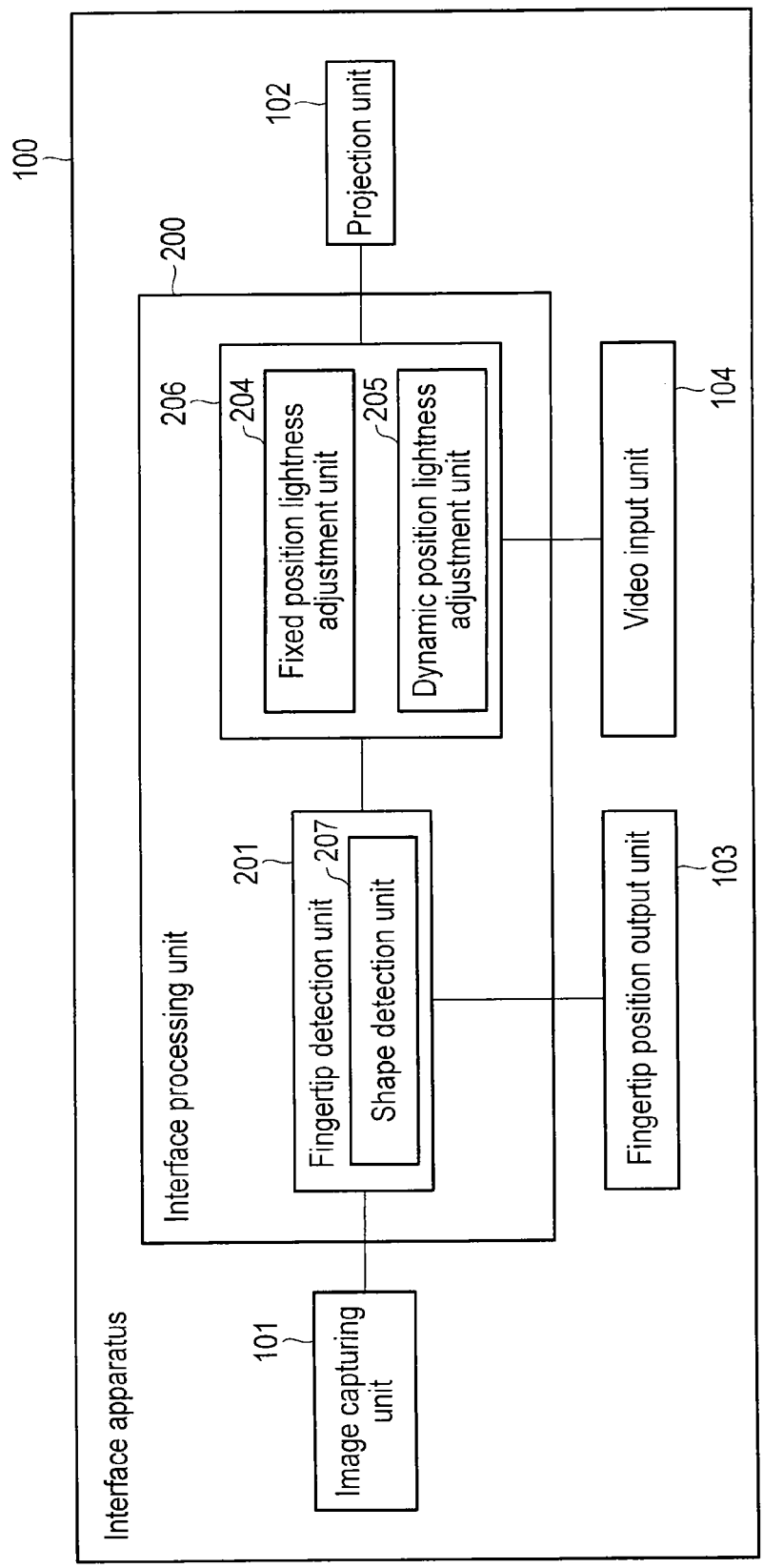
F I G. 16

INTERFACE APPARATUS, METHOD, AND RECORDING MEDIUM

CROSS-REFERENCE TO RELATED APPLICATIONS

This application is based upon and claims the benefit of priority from prior Japanese Patent Application No. 2011-020038, filed Feb. 1, 2011, the entire contents of which are incorporated herein by reference.

FIELD

Embodiments described herein relate generally to an interface apparatus, method, and recording medium.

BACKGROUND

Conventionally, most interface apparatuses for a screen on which a movie is projected by a projector make indirect operations via a screen of a display device using a special device such as a digital pen. In recent years, a technique that allows the user to directly make an operation on a screen using a general body part such as a finger or hand has been proposed.

BRIEF DESCRIPTION OF THE DRAWINGS

FIG. 1 is a block diagram showing an interface apparatus according to the first embodiment;

FIG. 2 is a block diagram showing an interface apparatus according to the second embodiment;

FIG. 5A is a view showing an activation action of a menu to be additionally displayed;

FIG. 5B is a view showing a clear action of the menu to be additionally displayed;

FIG. 7A is a view showing an operation on a display icon to be additionally displayed;

FIG. 7B is a view showing an operation on the display icon to be additionally displayed;

FIGS. 8A, 8B, 8C, and 8D are views for explaining pointing position highlighting according to the second embodiment;

FIG. 10 is a flowchart showing the operation of the interface apparatus according to the third embodiment;

FIG. 11 is a view showing an operation state of the interface apparatus according to the third embodiment;

FIG. 13 is a view showing a setting of a lightness adjustment region upon detection of a variation region of the interface apparatus according to the third embodiment;

FIG. 14 is a view showing a setting of a lightness adjustment region upon detection of a fingertip position of the interface apparatus according to the third embodiment;

FIG. 16 is a block diagram showing an interface apparatus according to the fourth embodiment;

DETAILED DESCRIPTION

Figure 3:
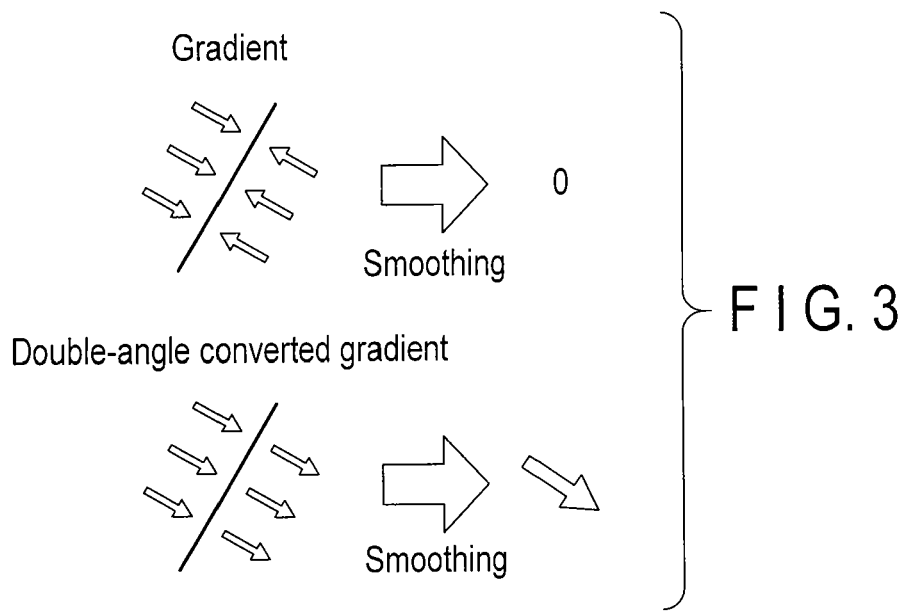
FIG. 3 is a view showing smoothing of gradient vectors.

In general, according to one embodiment, an interface apparatus for displaying a GUI object according to a position and a direction of a pointing object comprises a display unit, an image capturing unit, a detection unit, and an additional display unit. The display unit displays a movie based on a first image frame group. The image capturing unit obtains a second image frame group by capturing an image of a surface on which the movie is displayed. The detection unit detects a position and a direction of the pointing object based on the first image frame group and the second image frame group. The additional display unit displays a specific shape which is superimposed to the first image frame group, so that the detected position of the pointing object is irradiated with light of no less than a predetermined illuminance and the light attenuates according to a distance from the position.

Specifically, the present embodiment is directed to a user interface apparatus which allows the user to directly make an instruction to a screen of a projector or a large-screen display device by a pointing object such as a finger. In this embodiment, a position and direction of the pointing object which points to a location intended by the user are detected by an image capturing device, and a projected image of an interface object such as a menu is displayed at a position moved approximately by a predetermined amount from the detected position of the pointing object in the detected direction. Thus, when the user moves the finger or the like along the pointing direction of the pointing object such as the finger, he or she can easily select a command. Since the user's vision is not disturbed by overlapping the pointing object such as the finger and the projected image of the interface object such as the menu, an interface that the user can easily view can be implemented.

First Embodiment

FIG. 1 is a block diagram showing an interface apparatus according to the first embodiment. An interface apparatus 1 according to the first embodiment includes an image capturing unit 2 which captures an image of a pointing object such as a finger of the user, a display unit 3 which displays a movie based on a plurality of image frames, a detection unit 4 which detects a position and direction pointed by the pointing object within a screen on which the display unit 3 displays the movie, and an additional display unit 5 which displays a projected image of an interface object such as a menu at a position moved approximately by a predetermined amount from the pointing object so as not to overlap the pointing object in accordance with the position and direction of the pointing object detected by the detection unit 4. The additional display unit 5 superimposes image data of such interface on an image frame group of the movie to be displayed by the display unit 3. In this case, the image frame group indicates a plurality of image frames.

The image capturing unit 2 is arranged in a main body of the interface apparatus 1 or at a position independent of the main body, so as to be able to capture an image of the entire display surface displayed on the screen. The image capturing unit 2 captures a direct pointing action to the screen of the user's pointing object as a movie configured by a plurality of image frames. The image capturing unit 2 may always send the captured movie to the detection unit 4 or may send images to the detection unit 4 at predetermined threshold time intervals.

Figure 4:
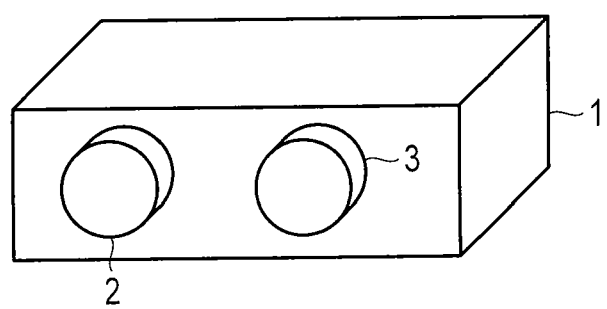
FIG. 4 is a view showing the outer appearance of an interface apparatus.

The display unit 3 which displays information may be, for example, a self-emitting type large-scale display or a projector which projects a movie onto the screen. In this embodiment, assume that the display unit 3 is a projector. In this embodiment, as shown in FIG. 4, a lens which configures the image capturing unit 2 and a lens of the projector which configures the display unit 3 are arranged in the device main body of the interface apparatus 1 at neighboring positions, so that their optical axes nearly match. Information to be displayed on the display unit 3 is arbitrary since it depends on an application which processes the information. For example, in this embodiment, assume that a digital album is used as the application, and an application screen of the digital album is displayed on the display unit 3. Therefore, the user can operate the application by, for example, a direct pointing action on the screen to an application movie of the digital album projected onto the screen.

The detection unit 4 detects a position pointed to by the pointing object such as the finger of the user and a pointing direction of the pointing object within the display surface displayed by the display unit 3 from the movie sent from the image capturing unit 2 or images sent at predetermined threshold time intervals. The detection unit 4 supplies the detected position and direction to the additional display unit 5. In this embodiment, for example, the user directly points to the screen with the finger, and the detection unit 4 detects this finger of the user. Note that an object to be detected is not limited to the finger of the user, and it may be a rod-like pointing object having an arc-shaped tip. For example, the position and direction of a long rod-like pen held by the hand of the user may be detected.

The detection unit 4 detects the position and direction of the pointing object by searching the captured image for the arc of the tip of the pointing object. For this purpose, the detection unit 4 is configured in advance to be able to calculate a difference between an image displayed on the display unit 3 and that captured by the image capturing unit 2. More specifically, a function having a brightness value before projection as an input and that after projection as an output is learned in advance for respective pixels or rectangles. The displayed information is subtracted from each frame of a movie or image captured by the image capturing unit 2 using the function which represents changes of the brightness values. In a difference image obtained by this process, only the pointing object which exists between the image capturing unit 2 and screen is left. By applying arc detection to that difference image, the position of the pointing object and its pointing direction are detected.

As an arc detection algorithm, for example, a method of determining, as an arc, a region where a similarity between edge gradients in a certain rectangle and an edge gradient template of an ideal arc shape is equal to or larger than a threshold can be used. By preparing the template in a plurality of quantized directions, not only the position but also the direction can be detected. Note that the detection unit 4 need not always execute detection when the application displayed by the display unit 3 is undergoing a state change such as a screen transition.

(Detection Algorithm of Projective Plane)

The projector and camera are set in advance so that their optical axes have the same direction, and are located at positions as close as possible. Unless a lens of the camera is changed, the projective plane can be captured at nearly the same position. Hence, expected positions of four corners of the projective plane, which are set in advance, are used as initial values, and accurate image coordinates of the four corners are detected from an image captured at the time of activation of the apparatus. From an image which is captured upon irradiation of light having a maximum luminance at the time of activation of the apparatus, portions around the initial values are processed using, for example, a Harris corner detector to detect most likely corner point coordinates. Under the assumption that the projective plane is a rectangle, a homography matrix is calculated from the detected coordinates of the four corners of the projective plane in the image, thus projectively transforming the captured image into an image having an aspect ratio at the time of irradiation. To this projectively transformed image, processing for detecting the fingertip or pen tip (that is, the pointing object) or the like is applied.

(Arc Detection Algorithm)

As pre-processing, the correspondence between brightness values to be displayed and captured brightness values is learned. This pre-processing is executed only once at the time of activation, and the result is held in the form of an LUT (Look Up Table).

Assume that a difference image is obtained by calculating a difference between the captured image of the projective plane and the displayed contents of the display unit. The difference image holds only information of an object which exists between the projective plane and camera.

The finger or pen tip as a pointing object used by the user is detected. In this case, assume that the fingertip or pen tip has an arc shape in the difference image, and its contour line is extracted. The processing sequence will be described below.

(1) Space derivatives of the image are calculated, and the obtained differential gradient orientation undergoes double-angle representation conversion.

(2) The double-angle representation converted differential gradient orientation for image is smoothed and then reduced in size.

(3) The differential image is scanned using a template to detect an arc.

Derivatives of image and double-angle representation conversion: A Roberts filter is applied to the derivatives of the image, and double-angle gradient vectors ($f_x$, $f_y$) are calculated by applying double-angle representation conversion to obtained gradient vectors ($g_x$, $g_y$), as given by:

$$f_x = g_x^2 - g_x^2$$

$$f_y = 2 g_x g_y$$

The reason why the double-angle representation conversion is required is to prevent gradient orientation information from being lost in subsequent smoothing and reduction processes. As shown in FIG. 3, when gradient vectors are smoothed intact, orientation s of gradients are opposite to each other to cancel each neighbor in a thin contour line. However, the double-angle representation conversion can convert orientations of gradient vectors that differ by 180° into the same orientation, and a gradient in the neighbor contour line can be prevented from being lost by smoothing.

Smoothing and reduction of gradient vector image: The double-angled gradient image undergoes smoothing processing for the purpose of noise reduction, and that image is reduced to a ½ size.

Arc detection using template: In normal template matching, one SAD or SSD value is calculated by single matching processing. However, since an arc having a plurality of radii has to be detected, high-precision detection cannot be attained by simple processing. In this embodiment, using a template which is generated in advance and includes double-angled gradient vectors toward the center, a central pixel of a region which matches the template can be detected as a central point of an arc. At the same time, since respective pixels of the template correspond to radii of circles from a central position and their directions, the directions and radii of the arc can be detected. That is, for one region to be detected, inner product values (each of which assumes a value from 0 to 1, and indicates a higher similarity as that value is closer to 1) of gradient vectors at respective pixels of the corresponding template are calculated, and are added to a parameter space having two axes, that is, a radius and direction. The parameter space corresponds to polar coordinate conversion when the central coordinates of a verification region are set as an origin, and can be expressed by:

$$P_\gamma = \sqrt{I_x^2 + I_y^2}$$
$$P_\theta = \tan^{-1}\frac{I_y}{I_x}$$

where $(I_x, I_y)$ are coordinates of each pixel when the central coordinates of the verification region are set as an origin, and $(P_\gamma, P_\theta)$ are coordinates of the parameter space to be voted and represent a radius and direction. In this embodiment, the radius and direction are handled by quantizing the radius to 16 levels, and the radius to 5 levels. However, when a higher resolution is required, the number of quantized levels is increased.

Since all values of the parameter space are initialized to "0" in advance, a maximum value of the parameter space undergoes threshold processing to determine whether or not the verification region includes an arc, and from positions having the maximum value of the parameter space, the radii and directions of the arc can be estimated.

The additional display unit 5 superimposes an interface such as a menu or icon, which can be selected by the user from the position detected by the detection unit 4 along the pointing direction, on the contents displayed by the display unit 3.

For example, an action of the user who stops the fingertip at a given position on the screen for a threshold time period or more, as shown in FIG. 5A, is assumed as an activation action for displaying an interface such as a menu or icon. Alternatively, an action of the user who draws a circular locus on the screen may be assumed as the activation action (a circular locus detection method will be described later). After activation, the menu or icon is always displayed at a position detected at the time of activation. When the pointing position of the user moves to an arbitrary command as a selection action or when the fingertip moves from the position at the time of activation over a distance equal to or larger than a threshold, the displayed interface is cleared. FIG. 5B shows this action. When a command is selected, the apparatus notifies the application (the digital album in this example) of selection of the command.

(Circular Locus Detection Method)

The circular locus detection method executes gesture recognition using a locus of detection points of the fingertip in respective frames. In this embodiment, since circle determination is effective, a circle determination method will be explained.

A locus of the finger for a maximum of two threshold frames is only used for a case in which the fingertip could be successively traced based on the number of previous threshold frames. Let n be the number of frames to be used, Pm be barycentric coordinates of n points, i be a current frame, and Pi be a detected point in that case. When the detected points in all n frames are separated from the barycentric coordinates by a given distance or more, a sum of the internal angles of an n-sided polygon having the barycentric point as a central point is calculated by:

$$Ang = \sum_{j=0}^{n-1} \tan^{-1}\left(\frac{\|P_m - P_{i-j}\|^2}{\|P_m - P_{i-j-1}\|^2}\right)$$

When the calculated sum Ang of the internal angles is equal to or larger than $2\pi$, it is determined that a locus of the detected points is a circle. The sum of the internal angles can be determined by subtracting a certain bias value from $2\pi$.

Figure 6B:
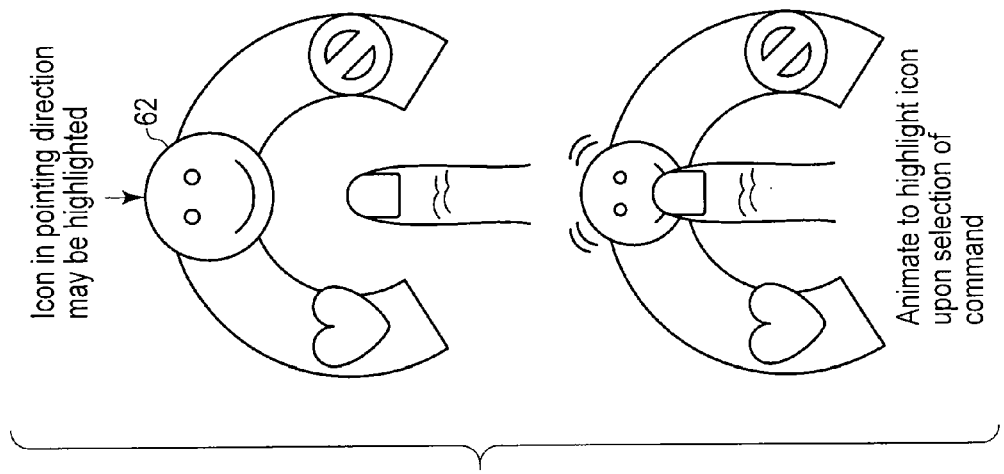
FIG. 6B is a view showing the menu to be additionally displayed.
Figure 6A:
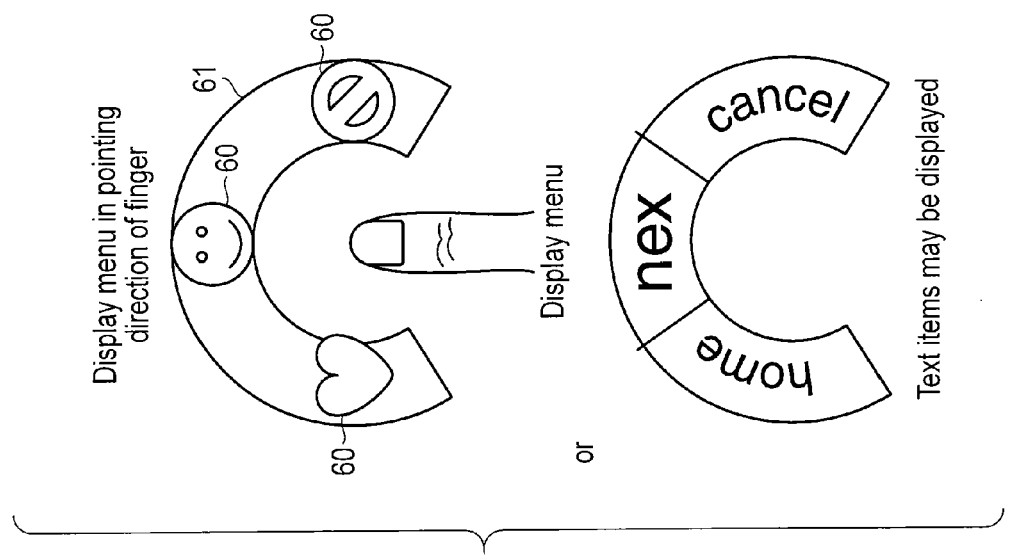
FIG. 6A is a view showing the menu to be additionally displayed.

As shown in FIG. 6A, menu items or icons 60 to be additionally displayed are laid out on a panel 61, the shape of which can be changed according to a ratio between the pointing direction of the user and a direction perpendicular to the pointing direction, and which has an arc shape (horseshoe shape) defined by partially notching an oval. For example, the panel 61 may be changed to a shape elongated 0.3 to 3 times in the pointing direction, or to an arc shape having a length of 30% to 80% with respect to the circumference of the oval.

In this embodiment, as shown in FIG. 6A, for example, the panel 61 has an oval shape which is elongated to 1.4 times in the pointing direction, and an arc shape having a length of 67% with respect to the circumference of the oval. The menu items or icons 60 are associated with commands selectable according to the state of the application. In place of the icons, text items may be displayed on the screen. If a priority order is set for the selectable commands in advance, a command 62 having a highest priority order may be laid out to be perpendicular to the pointing direction of the user, and may have a size larger than other commands, as shown in FIG. 6B. When a command is selected, the corresponding icon or text item may be highlighted by, for example, animation.

Furthermore, as shown in FIG. 7A, all commands to be additionally displayed need not be displayed at once, and an interface which displays at least one or more commands, and also displays icons 70 used to display other commands may be used. Alternatively, as shown in FIG. 7B, icons may be moved to follow a drawing action of a circular locus by the pointing object such as the finger of the user. In the case of the digital album as the application example of this embodiment, commands "change a full-screen displayed image (next photo, previous photo)", "zoom-in/out", "list display", "change the number of photos of the list display", "select", "back", "next", "menu cancel", and the like may be used. It is judged that the user selects a command when he or she moves the finger to a region of a given range which represents that command. For example, when the user selects a next photo move command, the application full-screen displays a certain image, but it changes an image to be displayed to that in the next order in an internally held image list upon selection by the user. The displayed menu may be cleared upon execution of a selection operation, or it may be kept displayed.

In this embodiment, the menu is kept displayed, and when, for example, the user keeps the finger to stop on the region that represents the next photo move command, it is judged that commands are selected at given intervals or intervals which become shorter gradually, and the displayed menu items are continuously changed. When an end point of the image list is reached, an icon or text item indicating the command is switched to an unselectable display state. When the user selects a command which can assume a continuous amount, for example, a zoom ratio of an image to be displayed, portions near the ends of the displayed horseshoe menu are changed to indications associated with zoom-in and zoom-out actions, so as to allow the user to directly designate the continuous amount. In this case, the continuous amount is changed in synchronism with the circular motion of the fingertip of the user. When the user selects a region which decides a set value, the value is decided at that time. After that, the previously displayed menu may be displayed again, or when the user releases the finger or the like from the horseshoe region used to designate the continuous amount, the currently designated value may be set, and the previously displayed menu may be displayed again. Commands used to designate continuous amounts may include a command used to designate a tone volume, that used to designate a display speed of a moving image (fast-forward, fast-rewind, etc.), that used to move a display zone upon displaying a plurality of images, and the like, in addition to the command used to designate the zoom ratio of an image to be displayed.

Second Embodiment

FIG. 2 is a block diagram showing an interface apparatus according to the second embodiment. The second embodiment can be practiced in combination with the aforementioned first embodiment. An interface apparatus 101 is substantially the same as the interface apparatus 1 except that it further includes a pointing position display unit 106. In the interface apparatus 101, a description of the same components as those of the interface apparatus 1 according to the first embodiment will not be repeated.

A detection unit 4 supplies a detected pointing position and direction of the user not only to an additional display unit 5 but also to the pointing position display unit 106. The pointing position display unit 106 makes an additional display at the pointing position of the user supplied from the detection unit 4, so as to give visual feedback to the user.

FIGS. 8A, 8B, 8C, and 8D are views for explaining pointing position highlighting according to the second embodiment.

The pointing position highlight display is attained by irradiating a central point C of the detected position of the pointing object such as the finger with light L of a maximum illuminance, as shown in FIG. 8A. This light L defines a shape in which the illuminance attenuates depending on a distance from its central point C (for example, the light L defines an oval shape). Since this light suppresses a luminance change of a background edge or texture in a region ROI (Region Of Interest) around the object (for example, finger) used when the user points, an effect of allowing robust detection by the detection unit 4 in the next frame can be obtained, as shown in FIG. 8B. Note that the region ROI has a spread that can include an image Sbt of the pointing object such as the finger extracted by a background difference in a captured image frame, and corresponds to the aforementioned oval shape in which the illuminance attenuates depending on a distance from the central point C.

As described above, according to this embodiment, by increasing the irradiated light amount around the detected finger, the robust detection precision of the finger in the detection unit 4 against a change in irradiated plane can be assured.

Since the pointing position display unit 106 makes an additional display with a maximum luminance around the pointing position of the user, a menu or icon displayed by the additional display unit 5 is not easily perceived in the same display mode as in the interface apparatus 1 according to the first embodiment. For this reason, when a display added by the pointing position display unit 106 overlaps the menu or icon, that specific icon or menu is preferably displayed in an enlarged scale, as shown in FIG. 8C, or using a balloon, as shown in FIG. 8D, so as to achieve a perceivable display mode.

Third Embodiment

Figure 9:
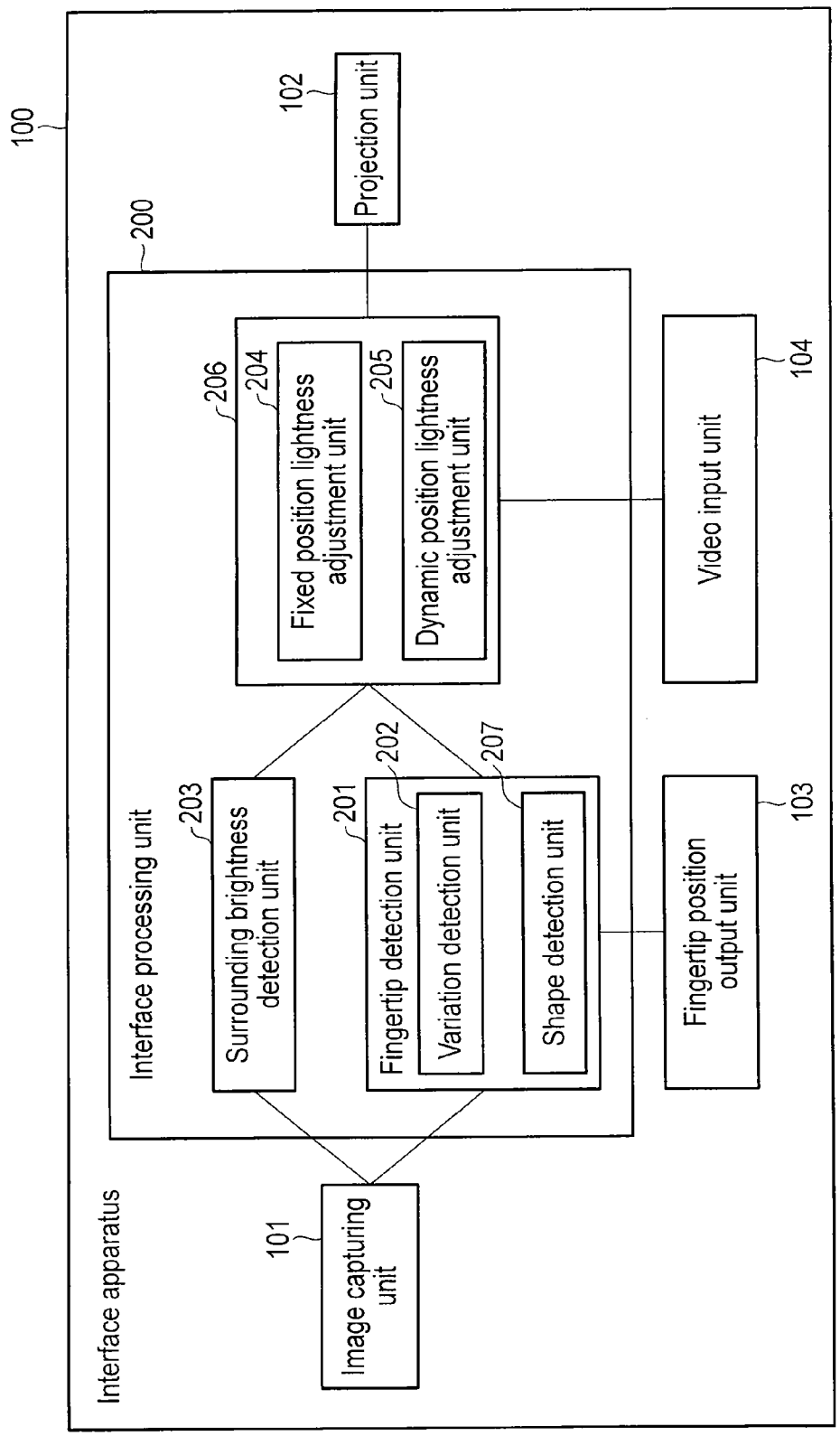
FIG. 9 is a block diagram showing an interface apparatus according to the third embodiment.

FIG. 9 is a block diagram showing an interface apparatus according to the third embodiment. The third embodiment can be practiced in combination with the aforementioned first or second embodiment. An interface apparatus 100 according to the third embodiment includes an image capturing unit 101, projection unit 102, fingertip position output unit 103, video input unit 104, and interface processing unit 200.

A description of the third and subsequent embodiments will be given under the assumption that a pointing object to be captured is the fingertip of the user. However, the pointing object is not limited to the fingertip, and it may be an arbitrary pointing tool (for example, pen tip).

The image capturing unit 101 acquires a captured image by capturing an image of a screen. By setting an image capturing range to include a range projected by the projection unit 102 on a screen surface, the user can make operations at every position of a projected movie. For example, when the image capturing unit 101 and projection unit 102 are set at close positions to have the same direction, as shown in FIG. 11 (to be described later), a projection range 301 and image capturing range 302 can be roughly matched. However, this setting condition is not indispensable. For example, when the user need only make operations on only a part of the projection range 301, at least that range can be included in the image capturing range 302. Also, the image capturing unit 101 and projection unit 102 may be independently set at remote places.

The projection unit 102 projects, onto the screen, a movie as a rewrite result of that input by the video input unit 104 by processing (to be described later) of the interface processing unit 200.

The fingertip position output unit 103 transmits the fingertip position detected by the interface processing unit 200 to a system to be operated.

The video input unit 104 inputs a movie, which is to be displayed by the system to be operated on the screen, to the interface processing unit 200.

The interface processing unit 200 includes a fingertip detection unit 201, fixed position lightness adjustment unit 204, and dynamic position lightness adjustment unit 205.

The fingertip detection unit 201 detects the fingertip from a movie captured by the image capturing unit 101, and includes a shape detection unit 207 and variation detection unit 202. The shape detection unit 207 detects a position of the fingertip from a captured movie captured by the image capturing unit 101 by a method such as template matching or pattern recognition. The variation detection unit 202 detects the position of the finger from a captured movie captured by the image capturing unit 101 using a method of detecting a variation such as a background difference or inter-frame difference.

A lightness adjustment unit 206 rewrites pixel values of an image input by the video input unit 104, and includes the fixed position lightness adjustment unit 204 and dynamic position lightness adjustment unit 205.

The fixed position lightness adjustment unit 204 rewrites pixel values of a specific region which is given in advance. The dynamic position lightness adjustment unit 205 rewrites pixel values of a region around a position of the fingertip or variation detected by the fingertip detection unit 201 or variation detection unit 202.

The interface processing unit 200 is implemented by, for example, a computer, and the fingertip detection unit 201, variation detection unit 202, fixed position lightness adjustment unit 204, and dynamic position lightness adjustment unit 205 are configured by software programs which implement the respective functions, and hardware components such as a CPU and memory required to execute these software programs. The interface processing unit 200 and the system to be operated may be executed by the same hardware. In this case, the fingertip position output unit 103 and video input unit 104 can be implemented by read and write accesses to a memory.

The operation of the interface processing unit 200 will be described below.

FIG. 10 is a flowchart showing the operation of the interface apparatus according to the third embodiment, and FIG. 11 is a view showing the operation state of the interface apparatus according to the third embodiment.

As shown in FIG. 11, the interface apparatus 100 of this embodiment assumes a case in which, for example, a terminal, which mounts the image capturing unit 101 such as a camera and the projection unit 102 such as a projector, projects a movie by the projection unit 102 toward a surface such as a wall of a room which serves as a screen, and a position of a fingertip 303 is detected from a movie obtained by the image capturing unit 101, thus allowing the user to make an operation on the screen.

In the interface apparatus 100, the fixed position lightness adjustment unit 204 sets a region, which is set in advance, as a lightness adjustment region 401 (step S101), changes pixel values of the lightness adjustment region in a movie input by the video input unit 104 (step S102), and outputs that movie to the projection unit 102.

Figure 12:
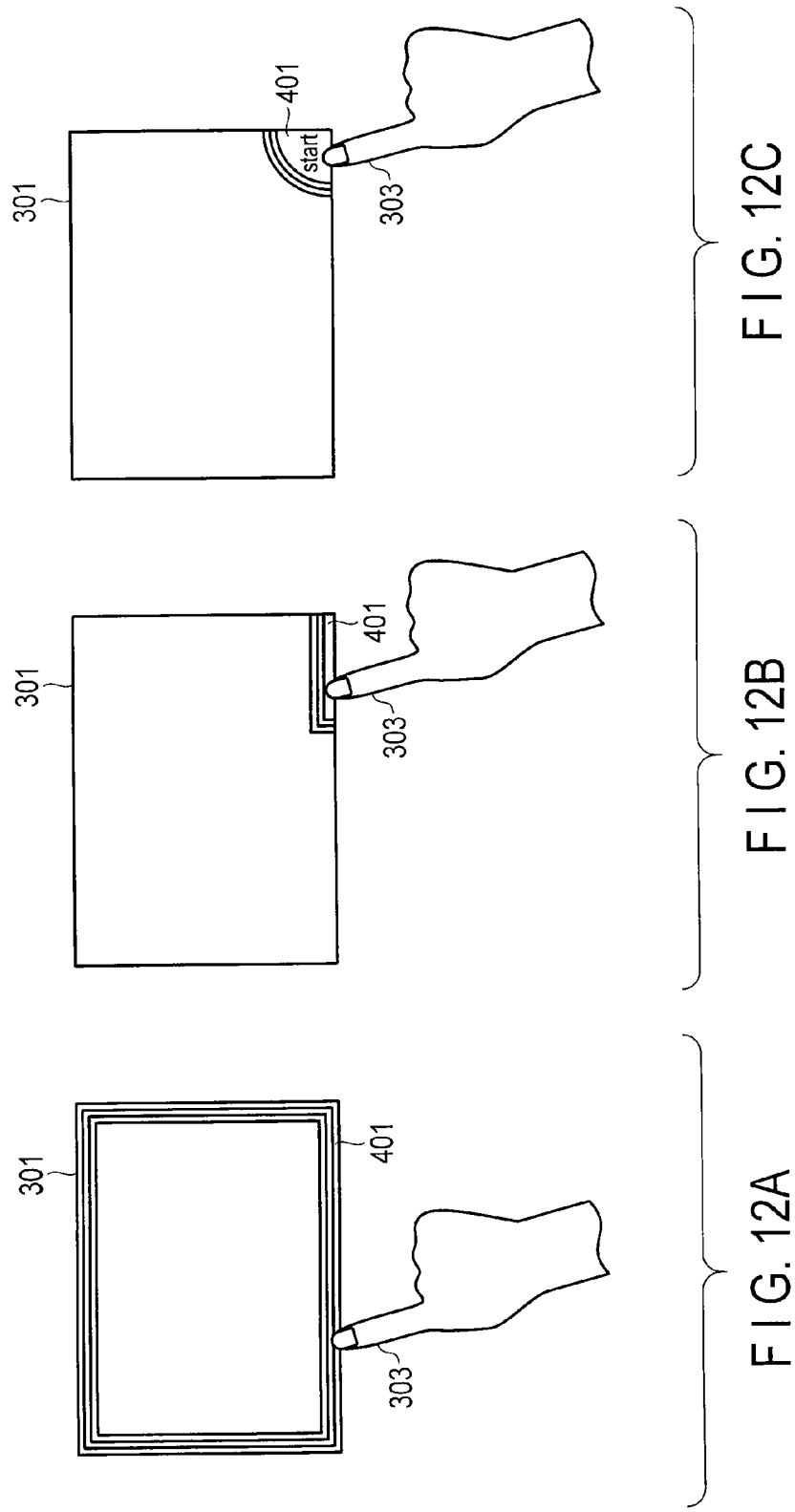
FIGS. 12A, 12B, and 12C are views showing settings of a fixed position lightness adjustment region of the interface apparatus according to the third embodiment.

FIGS. 12A, 12B, and 12C are views showing setting examples of the lightness adjustment region.

In step S101, the fixed position lightness adjustment unit 204 sets the lightness adjustment region 401 on the entire outer peripheral portion of the screen (FIG. 12A), or to have an elongated stripe shape on a part of the screen (FIG. 12B), or to have a circular or polygonal shape at a corner of the screen (FIG. 12C). Since the finger enters the screen after it passes through the outer peripheral portion of the screen, a load on the user can be reduced. By setting the lightness adjustment region near the outer peripheral portion, it does not disturb a displayed movie when pixel values are changed in step S102 (to be described later). The lightness adjustment region may be set at another place such as the center of the screen, if necessary. However, in order to stably detect a variation in step S104 (to be described later), the size of the adjustment region 401 has to be larger than a pixel width in an image captured by the image capturing unit 101. For example, the lightness adjustment region is set to have a width as large as one to several pixels in an image captured by the image capturing unit 101. Note that when the small lightness adjustment region 401 is set in a use environment in which importance is attached to the appearance of the screen, the image capturing unit 101 which has a high resolution to satisfy the aforementioned condition can be used. As another index required to decide the size of the lightness adjustment region 401, for example, a width may be set to be as large as one to several pixels with reference to a minimum pixel width that can be projected by the projection unit 102. As still another index required to decide the size of the lightness adjustment region 401, for example, a width as large as 0.1 to one finger may be set with reference to the width of the finger on the screen.

In step S102, the fixed position lightness adjustment unit 204 changes pixel values of the lightness adjustment region 401 to an arbitrary color (for example, white, red, yellow, green, or blue), which is given in advance. Equation (1) is an example in which the pixel values are changed to white (r=v255, g=255, b=255).

$$\begin{cases} R' = r \\ G' = g \\ B' = b \end{cases} \quad (1)$$

where R', G', and B' respectively represent red, green, and blue component values after an image is changed. In place of changing the pixel values to an arbitrary color, an original image and arbitrary color may be alpha-blended by:

$$\begin{cases} R' = (1-\alpha)R + \alpha r \\ G' = (1-\alpha)G + \alpha g \\ B' = (1-\alpha)B + \alpha b \end{cases} \quad (2)$$

where R, G, and B respectively represent red, green, and blue component values of an original image, and α is a coefficient which is given in advance to fall within a range from 0.0 to 1.0. Furthermore, near the boundary of the lightness adjustment region 401, the boundary may be blurred by setting α=1 on the boundary line and setting α to be closer to 0 as a position is separated farther away from the region. In order to inform the user that an operation is to be made by the finger, for example, a character string "Start" and graphics such as a finger shape and buttons may be displayed around or inside the lightness adjustment region 401. When the character string and graphics are displayed inside the region, their color is set to be close to a background color, thereby suppressing an adverse influence on the finger detection precision.

Next, the image capturing unit 101 acquires an image by capturing a movie projected onto the screen (step S103), and the variation detection unit 202 detects a position of a variation region from the acquired image (step S104).

In step S104, the variation detection unit 202 detects a variation region by the finger in the lightness adjustment region 401. The finger is detected using a method of allowing to detect the finger even when only a part of the finger appears in the image, for example, a background difference, inter-frame difference, colors (for example, a flesh color has H (hue)=0 to 30 on an HSV color system), and the like. Since a movie projected by the projection unit 102 is stable in the lightness adjustment region 401, a variation can be easily detected.

Whether or not a variation region is detected is determined (step S105). Whether or not a variation region is detected is determined by, for example, comparing an area of a variation region with a threshold. A small variation region is ignored as noise of the image. If no variation region is detected, it is judged that an operation is not made at that time, and the processing ends.

On the other hand, if a variation region is detected, the dynamic position lightness adjustment unit 205 sets a lightness adjustment region 401 (step S106), changes pixel values of the lightness adjustment region 401 (step S107), and outputs the image to the projection unit 102.

FIG. 13 is a view showing the setting of a lightness adjustment region upon detection of a variation region.

In step S106, for example, as shown in FIG. 13, the dynamic position lightness adjustment unit 205 sets the lightness adjustment region 401 in a region in which distances from a variation region 501 are equal to or smaller than a threshold or inside a circle having a radius, which is given in advance, from the center of the variation region. Alternatively, the lightness adjustment region 401 may be set as an oval having radii which are different in a direction perpendicular to the outer peripheral side of the projection range 301 and in a direction parallel to that side. The threshold of the distance or the radius of the circle is designated to be about 1, 1.5, or 2 times of a maximum moving distance of the finger within one frame (for example, 1/30 sec, 1/15 sec, etc.) assumed by the interface apparatus, so that the fingertip is included in the lightness adjustment region 401. When a large radius is set, the fingertip detection precision is enhanced, but the lightness adjustment region disturbs a projected movie. At this time, the lightness adjustment region 401 set in step S101 may be cleared or it may be kept displayed. The lightness adjustment region 401 is preferably kept displayed when operations are made by two or more hands.

In step S107, the dynamic position lightness adjustment unit 205 changes pixel values in the lightness adjustment region 401 by the same method as in step S102. In this case, a display may be animated to gradually increase the size of the lightness adjustment region 401.

Next, the image capturing unit 101 acquires an image by capturing a movie projected onto the screen (step S108), and the fingertip detection unit 201 detects the fingertip position from the acquired image (step S109).

In step S109, the fingertip detection unit 201 detects the fingertip position in the lightness adjustment region 401. A position where a similarity is equal to or higher than a threshold is detected as the fingertip position using a method of allowing to accurately detect the fingertip position, for example, template matching using an edge direction. The fingertip position may be detected using a method such as circular Hough transformation, a separability filter, or pattern recognition.

Whether or not the fingertip is detected is determined (step S110). If no fingertip is detected, it is judged that an operation is not made at that time, and the processing ends.

On the other hand, if the fingertip is detected, the fingertip position output unit 103 outputs the fingertip position to the system to be operated (step S111), and a lightness adjustment region is set around the fingertip (step S112). The process then returns to step S107.

FIG. 14 is a view showing the setting of a lightness adjustment region upon detection of the fingertip position.

In step S112, a lightness adjustment region 401 is set inside a circle which has a fingertip position 502 detected by the fingertip position output unit 103 as the center, and a radius which is given in advance by the same method as in step S106.

At this time, the lightness adjustment region 401 set in step S106 is cleared. The lightness adjustment region 401 set in step S101 may be cleared or it may be kept displayed.

States from when the user starts an operation until he or she ends the operation using the aforementioned interface apparatus will be described below.

Figure 15:
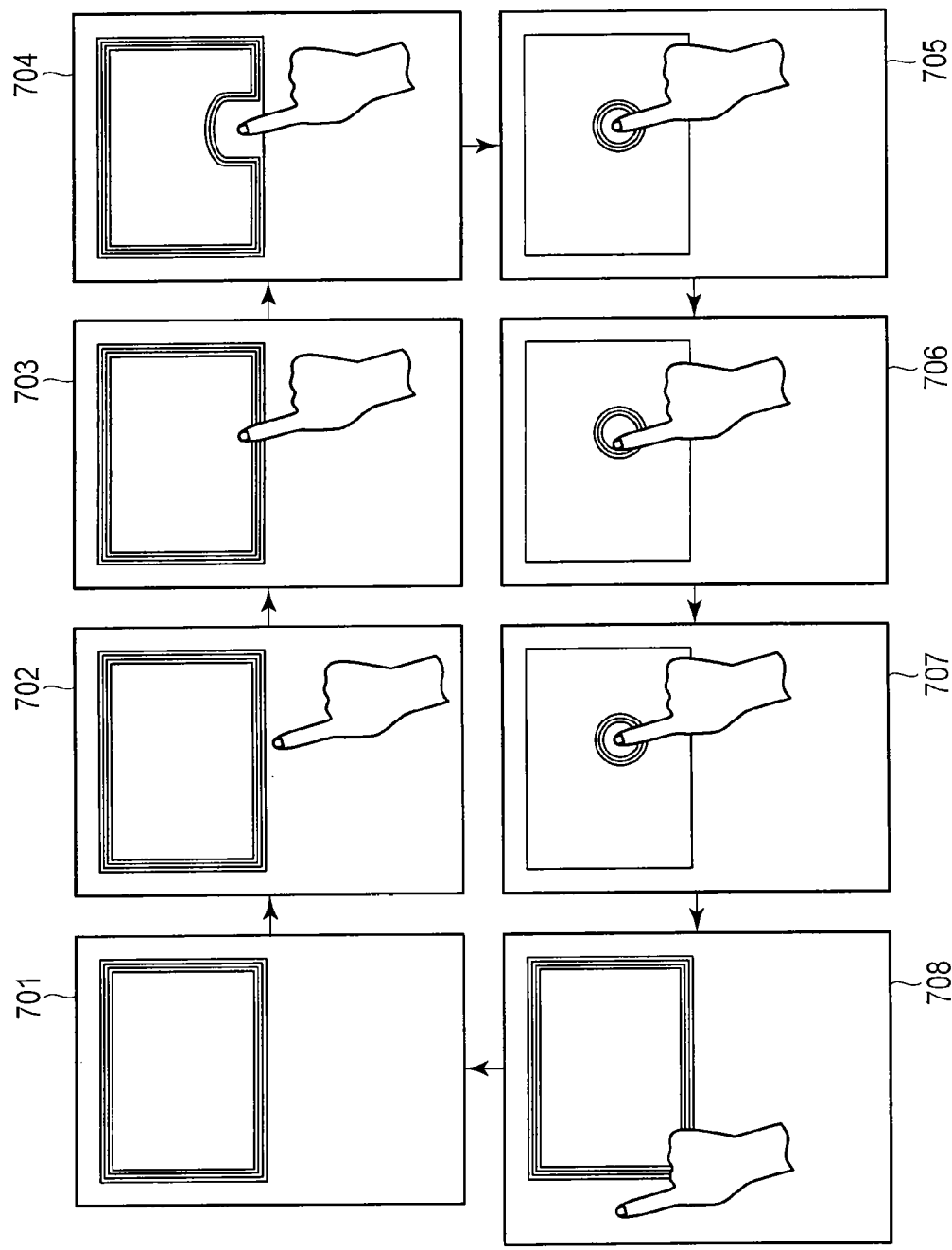
FIG. 15 shows changes of the lightness adjustment region depending on the fingertip position of the interface apparatus according to the third embodiment.

FIG. 15 shows changes of the lightness adjustment region depending on the fingertip position of the user.

A state 701 is an initial state.

In a state 702, since the finger of the user is still located outside the projection range 301, the lightness adjustment region 401 is set on the outer peripheral portion in steps S101 and S102.

In a state 703, the finger enters the projection range 301, a variation region is detected in steps S103 to S105, and the lightness adjustment region 401 is set around the variation region in steps S106 and S107. As a result, the state 703 transits to a state 704.

In the state 704, the fingertip is detected in steps S108 to S110, and the lightness adjustment region 401 is set around the fingertip position in steps S112 and S107. As a result, the state 704 transits to a state 705.

In a state 706, the finger moves to the left, the fingertip is detected in steps S108 to S110, and the lightness adjustment region 401 is set around the fingertip position in steps S112 and S107. As a result, the state 706 transits to a state 707. The above operations are repeated until the finger moves outside the projection range 301.

In a state 708, since the finger moves outside the projection range 301, the lightness adjustment region 401 is set on the outer peripheral portion in steps S101 and S102. Thus, the state returns to the initial state.

As described above, according to the interface apparatus of the third embodiment, since the fixed position lightness adjustment unit 204 changes pixel values of a movie input by the video input unit 104, the variation detection unit 202 can stably detect the fingertip in the lightness adjustment region 401.

Also, according to the interface apparatus of the third embodiment, since the dynamic position lightness adjustment unit 205 changes pixel values of a movie input by the video input unit 104, the fingertip detection unit 201 can stably detect the fingertip in the lightness adjustment region 401.

Furthermore, according to the interface apparatus of the third embodiment, the fixed position lightness adjustment unit 204 sets the lightness adjustment region 401, and the variation detection unit 202 detects a variation region. Then, the dynamic position lightness adjustment unit 205 sets the lightness adjustment region 401 around the variation region, and the shape detection unit 207 detects the fingertip position. Thus, with these two fingertip detection stages, the lightness adjustment region 401 can be reduced, and the appearance of a movie on the screen is not so impaired.

Modification 1

In modification 1 of the interface apparatus 100 according to the third embodiment, the interface processing unit 200 also includes a surrounding brightness detection unit 203. The surrounding brightness detection unit 203 detects a brightness of a light source other than the projection unit 102 by comparing a brightness of a region which is not irradiated with light by the projection unit 102 of a captured movie captured by the image capturing unit 101 with a threshold, which is given in advance. The region which is not irradiated with light by the projection unit 102 includes that outside the projection range 301, that inside the projection range 301 when the projection unit 102 does not emit light, and that inside a black region when the projection unit 102 displays a movie locally including the black region.

When the surrounding brightness detection unit 203 judges that a surrounding portion is bright, the dynamic position lightness adjustment unit 205 and fixed position lightness adjustment unit 204 do not change any pixel values in steps S102 and S107. When environmental light such as illumination right in a room is bright, since the influence of light of the projection unit 102 becomes relatively small, the fingertip can be detected without changing the pixel values. Hence, the pixel values need not be changed in such case.

According to the interface apparatus of modification 1, since a stripe of the outer peripheral portion is cleared when it is not necessary, a factor that disturbs a displayed movie can be eliminated.

Modification 2

Modification 2 of the interface apparatus 100 according to the third embodiment is directed to a modification of step S105. That is, if it is determined in step S105 that a variation region is detected, the fingertip position output unit 103 outputs that variation position, thus ending the processing.

In a case of a GUI on which buttons, icons, and the like, which are to be operated, are laid out on the outer peripheral portion of the projection range 301, since the fingertip position need only be detected on the outer peripheral portion alone, steps S106 to S112 are not executed.

Fourth Embodiment

FIG. 16 is a block diagram showing an interface apparatus according to the fourth embodiment. The arrangement of an interface apparatus 100 according to the fourth embodiment is the same as that of the third embodiment, except that the variation detection unit 202 is not included.

Figure 17:
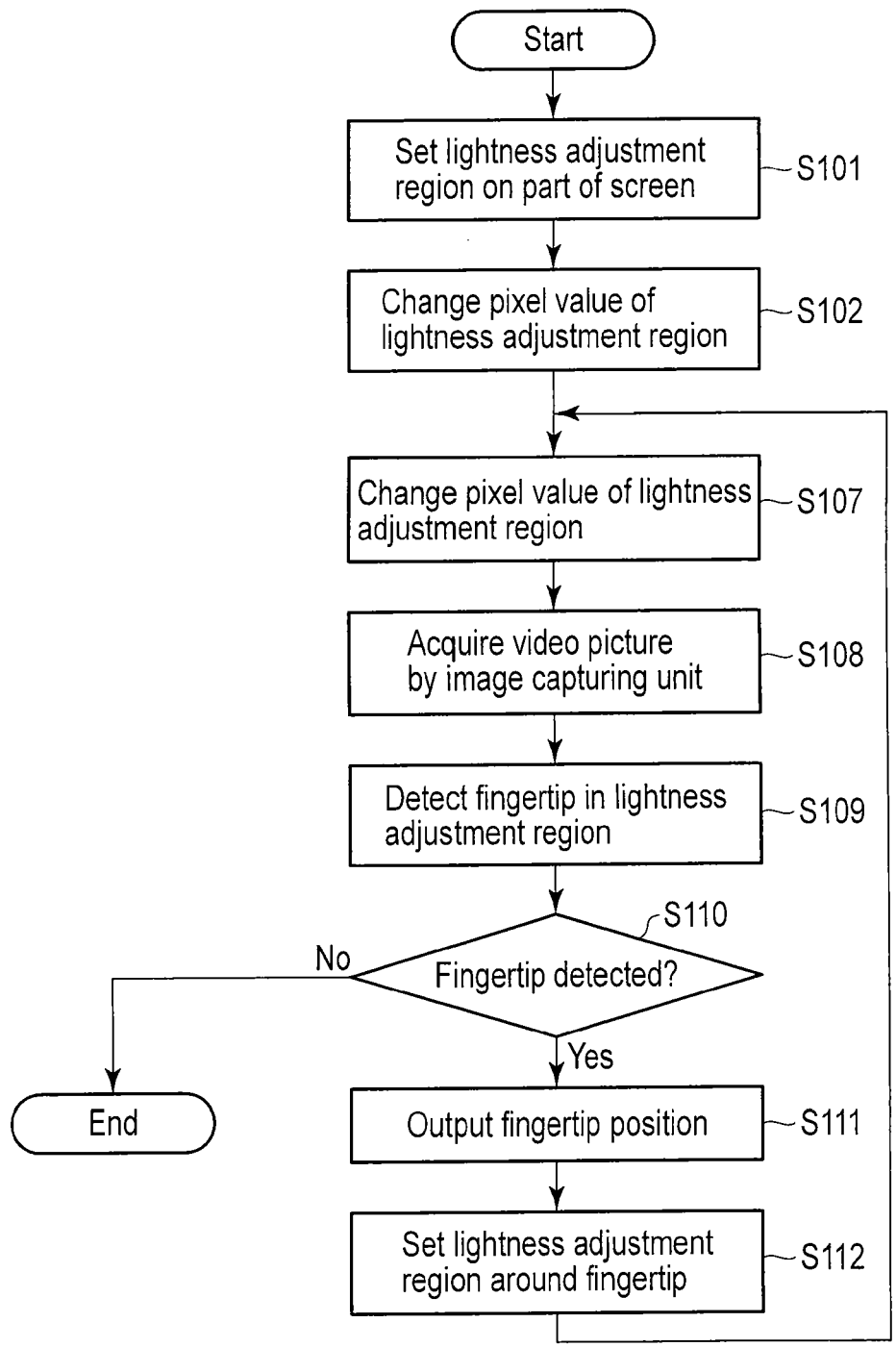
FIG. 17 is a flowchart showing the operation of the interface apparatus according to the fourth embodiment.
Figure 18:
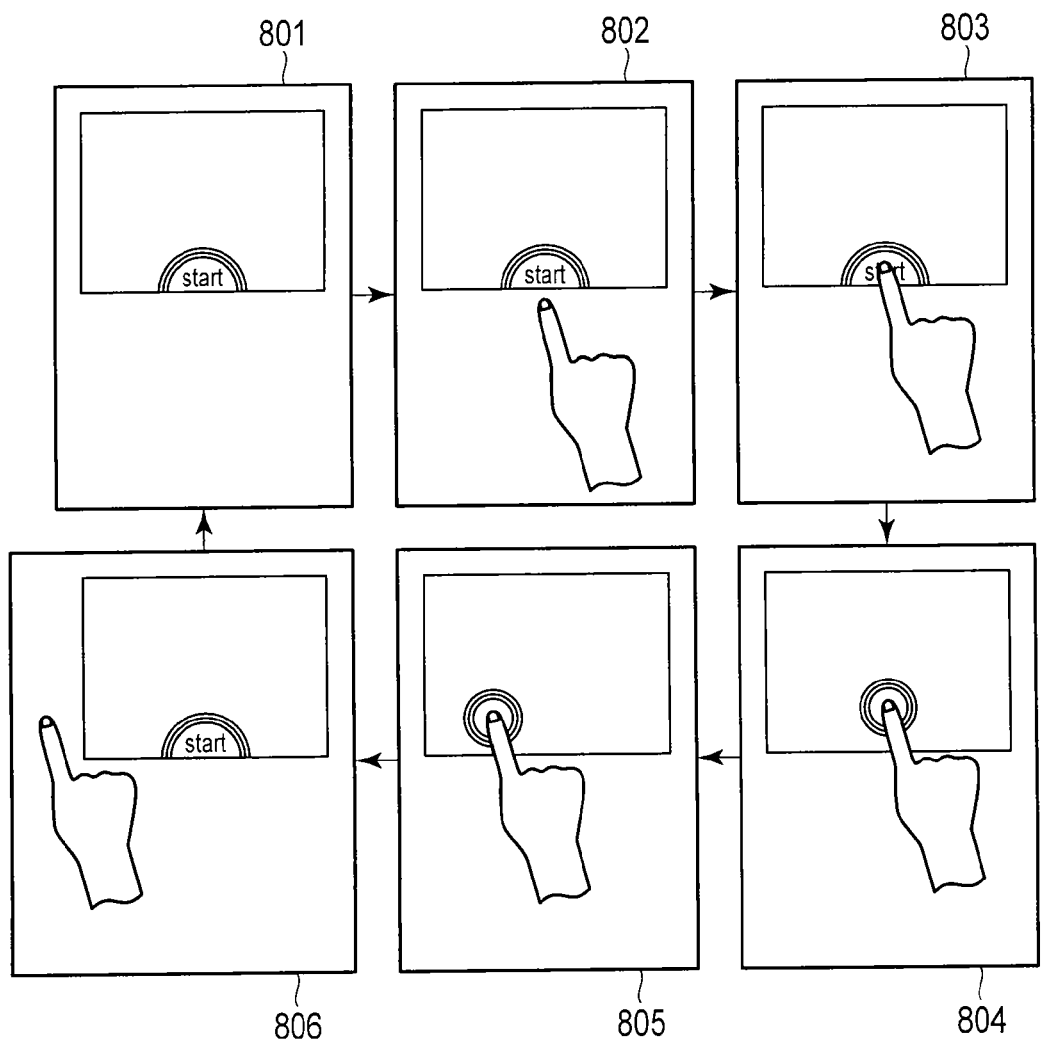
FIG. 18 shows changes of a lightness adjustment region depending on the fingertip position of the interface apparatus according to the fourth embodiment.

FIG. 17 is a flowchart showing the operation of the interface apparatus according to the fourth embodiment. FIG. 18 shows changes of a lightness adjustment region depending on the fingertip position of the user according to the fourth embodiment. Transitions of states 801 to 806 in FIG. 18 roughly correspond to those of the states 701 to 708 shown in FIG. 15.

The operation of an interface processing unit 200 will be described below.

In the interface apparatus 100 according to the fourth embodiment, a fixed position lightness adjustment unit 204 sets a region, which is set in advance, as a lightness adjustment region 401 (step S101), changes pixel values in the lightness adjustment region of a movie input by a video input unit 104 (step S102), and then outputs that movie to a projection unit 102.

In step S101, the fixed position lightness adjustment unit 204 sets the lightness adjustment region 401 larger than the fingertip on the screen. Since the size of the adjustment region 401 becomes larger than the third embodiment, that region is preferably set inside a circle or polygonal region on a part of the outer peripheral portion without being set as a stripe shape on the outer peripheral portion. The lightness adjustment region 401 is set to have, for example, a size as large as 1.5 to 3 fingers with reference to the size of the finger on the screen. This is for the following reason. That is, since the fingertip is detected using a shape in step S109 (to be described later), the fingertip has to be included inside the lightness adjustment region 401 so as to discriminate a fingertip shape.

Steps S102 and S107 to S112 are the same as the third embodiment.

According to the interface apparatus of the fourth embodiment, in an environment in which the background of a projection range 301 varies for a reason such as movement of a screen, the fingertip position can stably be detected using only the shape of the fingertip.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interface apparatus for displaying a GUI object according to a position and a direction of a pointing object having an arc shape, comprising:
a display unit configured to display a movie based on a first image frame group;
an image capturing unit configured to obtain a second image frame group by capturing an image of a surface on which the movie is displayed;
a detection unit configured to detect a position and a direction of the pointing object based on the arc shape of the pointing object, the first image frame group, and the second image frame group; and
an additional display unit configured to display a specific shape which is superimposed to the first image frame group, so that the detected position of the pointing object is irradiated with light of no less than a predetermined illuminance and the light attenuates according to a distance from the position, wherein the detection unit is configured to detect a position and a direction of the pointing object by using inner product values of gradient vectors at respective pixels of a template.

2. The apparatus according to claim 1, wherein the detection unit is configured to detect a position and a direction of the pointing object in a region corresponding to the specific shape.

3. The apparatus according to claim 1, wherein the display unit is configured to display a GUI object which is laid out around the pointing object, and has an arc shape defined by partially notching an oval so as not to overlap the pointing object.

4. The apparatus according to claim 1, wherein the additional display unit is configured to display a GUI object which serves as a menu pointable by the pointing object, and has a plurality of icons or text items laid out within the menu, the icons or text items being associated with commands.

5. The apparatus according to claim 3, wherein the additional display unit is configured to display the interface so as to locate a center of the arc shape in a direction of the pointing object.

6. The apparatus according to claim 1, wherein the additional display unit is configured to begin to display the interface according to stoppage of a position of the pointing object over a predetermined time period or a specific locus of the position.

7. The apparatus according to claim 1, wherein the additional display unit is configured to end display of the interface according to a moving distance of not less than a given amount of the pointing object.

8. The apparatus according to claim 4, wherein the additional display unit is configured to highlight an icon or text item corresponding to a direction of the pointing object with respect to other icons or text items.

9. The apparatus according to claim 4, wherein the additional display unit is configured to highlight an icon or text item selected by the pointing object with respect to non-selected icons or text items.

10. The apparatus according to claim 4, wherein the additional display unit is configured to lay out some of the plurality of icons or text items within the menu, and to display a button used to change icons or text items to be displayed.

11. The apparatus according to claim 10, wherein the additional display unit is configured to change the icons or text items to be displayed according to a specific moving locus of the pointing object.

12. The apparatus according to claim 4, wherein the additional display unit is configured to display an icon or text item which overlaps the specific shape in an enlarged scale or to display an icon or text item which overlaps the specific shape together with a balloon.

13. The apparatus according to claim 1, further comprising a fixed position lightness adjustment unit configured to change a brightness of a specific region at a fixed position in each individual frame of the first image frame group.

14. The apparatus according to claim 13, wherein the specific region is at least a part of a periphery of the surface on which the movie is displayed.

15. The apparatus according to claim 13, wherein the detection unit is configured to detect a position of the pointing object or a variation of the second image frame group inside the specific region using a background difference or an interframe difference.

16. The apparatus according to claim 13, further comprising a surrounding brightness detection unit configured to detect a brightness of environmental light by comparing a pixel value of a position where a movie is not displayed by the display unit in the second image frame group with a threshold, which is given in advance,
wherein the fixed position lightness adjustment unit changes a movie to be displayed by the additional display unit according to the brightness of the environmental light.

17. An interface method for displaying a GUI object according to a position and a direction of a pointing object having an arc shape, comprising:
controlling a display unit to display a movie based on a first image frame group;
controlling an image capturing unit to obtain a second image frame group by capturing an image of a surface on which the movie is displayed;
controlling a detection unit to detect a position and a direction of the pointing object based on the arc shape of the pointing object, the first image frame group, and the second image frame group;
controlling an additional display unit to display a specific shape which is superimposed to the first image frame group, so that the detected position of the pointing object is irradiated with light of no less than a predetermined illuminance and the light attenuates according to a distance from the position; and
detecting a position and a direction of the pointing object by using inner product values of gradient vectors at respective pixels of a template.

18. A non-transitory storage medium storing a program for displaying a GUI object according to a position and a direction of a pointing object having an arc shape, the program comprising:
displaying a movie based on a first image frame group;
obtaining a second image frame group by capturing an image of a surface on which the movie is displayed;
detecting a position and a direction of the pointing object based on the arc shape of the pointing object, the first image frame group, and the second image frame group;
displaying a specific shape which is superimposed to the first image frame group, so that the detected position of the pointing object is irradiated with light of no less than a predetermined illuminance and the light attenuates according to a distance from the position; and
detecting a position and a direction of the pointing object by using inner product values of gradient vectors at respective pixels of a template.

* * * * *

UNITED STATES PATENT AND TRADEMARK OFFICE
CERTIFICATE OF CORRECTION

PATENT NO.       : 8,884,985 B2
APPLICATION NO.  : 13/240390
DATED            : November 11, 2014
INVENTOR(S)      : Shibata et al.

Page 1 of 1

It is certified that error appears in the above-identified patent and that said Letters Patent is hereby corrected as shown below:

On the Title Page

Under "Assignee":

Item (73) – please correct: "Kabushiki, Kaisha Toshiba" to -- Kabushiki Kaisha Toshiba, Minato-ku, Tokyo (JP) --.

Signed and Sealed this
Seventeenth Day of February, 2015

Michelle K. Lee
*Deputy Director of the United States Patent and Trademark Office*